(12) United States Patent
Nakanishi et al.

(10) Patent No.: US 9,255,636 B2
(45) Date of Patent: Feb. 9, 2016

(54) SHIFT DEVICE

(71) Applicants: KABUSHIKI KAISHA TOKAI-RIKA-DENKI-SEISAKUSHO, Aichi (JP); NISSAN MOTOR CO., LTD, Kanagawa (JP)

(72) Inventors: Kenji Nakanishi, Aichi (JP); Daisuke Yamamoto, Kanagawa (JP)

(73) Assignees: KABUSHIKI KAISHA TOKAI-RIKA-DENKI-SEISAKUSHO, Aichi (JP); NISSAN MOTOR CO., LTD, Kanagawa (JP)

( * ) Notice: Subject to any disclaimer, the term of this patent is extended or adjusted under 35 U.S.C. 154(b) by 0 days.

(21) Appl. No.: 14/396,216

(22) PCT Filed: Apr. 2, 2013

(86) PCT No.: PCT/JP2013/060120
§ 371 (c)(1),
(2) Date: Oct. 22, 2014

(87) PCT Pub. No.: WO2013/161525
PCT Pub. Date: Oct. 31, 2013

(65) Prior Publication Data
US 2015/0101448 A1   Apr. 16, 2015

(30) Foreign Application Priority Data

Apr. 26, 2012  (JP) ................................. 2012-101617

(51) Int. Cl.
*F16H 59/10* (2006.01)
*F16H 59/02* (2006.01)
*B60K 20/02* (2006.01)
*B60K 20/04* (2006.01)

(52) U.S. Cl.
CPC ............ *F16H 59/0278* (2013.01); *B60K 20/02* (2013.01); *B60K 20/04* (2013.01); *F16H 59/10* (2013.01)

(58) Field of Classification Search
CPC ............ F16H 59/10; G05G 7/04; G05G 1/04; B60K 20/04
See application file for complete search history.

(56) References Cited

U.S. PATENT DOCUMENTS 3,766,799 A * 10/1973 DeSloovere ................ 74/473.15
4,732,232 A * 3/1988 Miyagi et al. ................. 180/336

(Continued)

FOREIGN PATENT DOCUMENTS

JP    H0537543       5/1993
JP    2008-155908    7/2008

OTHER PUBLICATIONS

Japanese Office Action dated Nov. 4, 2015 and English translation of Notice of Reasons for Rejection.

*Primary Examiner* — Vicky Johnson
(74) *Attorney, Agent, or Firm* — Roberts Mlotkowski Safran & Cole, P.C.

(57) ABSTRACT

In a shift lever device (10), due to a tilt shaft (58) being nipped between peripheral surfaces of lower supporting holes (20) of a shift lever plate (12) and peripheral surfaces of upper supporting holes (38A) of a shift lever guide (26), a shift lever (52) is supported so as to be able to tilt around the tilt shaft (58). A shift position of the shift lever (52) is changed due to the shift lever (52) being tiltingly operated while being guided by a guide hole (30) of the shift lever guide (26) and passed within a passage hole (64) of a cover (62). Here, the strength of the shift lever guide (26) is made to be large as compared with that of the cover (62). Moreover, when load is inputted from the shift lever (52) to the shift lever guide (26), rotation of the shift lever guide (26) is stopped by the shift lever plate (12). Therefore, the shift lever (52) can be tiltably supported properly.

10 Claims, 6 Drawing Sheets

(56) References Cited

U.S. PATENT DOCUMENTS 4,991,460 A * 2/1991 Shirahama et al. ............. 74/523
5,249,478 A * 10/1993 Moroto et al. ............. 74/473.18
5,497,673 A * 3/1996 Kataumi et al. ............. 74/473.3
2014/0238172 A1 * 8/2014 Nakanishi et al. ........... 74/473.3

* cited by examiner

SHIFT DEVICE

TECHNICAL FIELD

The present invention relates to a shift device at which a shift position is changed by a shift member being tilted.

BACKGROUND ART

In the shift lever device disclosed in Japanese Patent Application Laid-Open (JP-A) No. 2008-155908, a shift lever is tiltably passed-through a plate and an upper side bracket member, and the shift lever is tiltably supported due to a shift rotating shaft of the shift lever being nipped between the upper side bracket member and a lower side bracket member.

In this shift lever device, even if the shift lever is tilted, the shift lever cannot abut the upper side bracket member. Therefore, it can be understood that load is not inputted from the shift lever to the upper side bracket member.

Here, if load were to be inputted from the shift lever to the upper side bracket member, if displacement of the upper side bracket member due to load inputted from the shift lever were not stopped, the shift rotating shaft could not be properly nipped between the upper side bracket member and the lower side bracket member, and there would be the possibility that the shift lever could not be tiltably supported properly.

SUMMARY OF INVENTION

Technical Problem

In consideration of the above-described circumstances, an object of the present invention is to provide a shift device that can tiltably support a shift member properly.

Solution to Problem

A shift device of a first aspect of the present invention comprises: a shift member at which a supporting shaft is provided, and whose shift position is changed due to the shift member being tilted; a through member through which the shift member is tiltably passed; a strength member through which the shift member is tiltably passed at further toward a supporting shaft side than the through member, and whose strength is high as compared with that of the through member; and a stopping member at which the shift member is tiltably supported due to the supporting shaft being nipped between the stopping member and the strength member, and that stops displacement of the strength member that is due to load inputted from the shift member.

In the shift device of the first aspect of the present invention, the supporting shaft is provided at the shift member, and the shift position is changed due to the shift member being tilted. Further, the shift member is tiltably passed-through the through member, and the shift member is tiltably passed-through the strength member at further toward the supporting shaft side than the through member, and the supporting shaft is nipped between the strength member and the stopping member. The shift member is thereby supported tiltably.

Here, because the strength of the strength member is made to be high as compared with that of the through member, the nipping rigidity of the supporting shaft by the strength member is made to be great. Moreover, the stopping member stops displacement of the strength member that is due to load inputted from the shift member. Due thereto, the supporting shaft can be nipped properly between the strength member and the stopping member, and the shift member can be tiltably supported properly.

In a shift device of a second aspect of the present invention, in the shift device of claim 1, a stronger of the strength member and the stopping member supports the supporting shaft at tilting direction both sides of the shift member.

In the shift device of the second aspect of the present invention, the stronger of the strength member and the stopping member supports the supporting shaft at tilting direction both sides of the shift member. Therefore, movement of the supporting shaft toward shift member tilting direction both sides can be restricted effectively, and the shift member can be tiltably supported more properly.

In a shift device of a third aspect of the present invention, in the shift device of claim 1 or claim 2, a central angle of the supporting shaft, that is supported by a stronger of the strength member and the stopping member, is made to be large as compared with a central angle of the supporting shaft that is supported by a weaker of the strength member and the stopping member.

In the shift device of the third aspect of the present invention, the central angle of the supporting shaft, that is supported by the stronger of the strength member and the stopping member, is made to be large as compared with the central angle of the supporting shaft that is supported by the weaker of the strength member and the stopping member. Therefore, movement of the supporting shaft can be restricted effectively, and the supporting shaft can be nipped more properly between the strength member and the stopping member.

In a shift device of a fourth aspect of the present invention, the shift device of any one of claim 1 through 3 further comprises a pressing portion that is provided at the strength member or the stopping member, and that, by being deformed at a time when the strength member and the stopping member are assembled, presses the strength member or the stopping member, and increases at least one of stopping force of the strength member by the stopping member and nipping force of the supporting shaft by the strength member and the stopping member.

In the shift device of the fourth aspect of the present invention, at the time when the strength member and the stopping member are assembled, due to the pressing portion that is provided at the strength member or the stopping member being deformed, the strength member or the stopping member is pressed, and at least one of the stopping force of the strength member by the stopping member, and the nipping force of the supporting shaft by the strength member and the stopping member, is increased. Therefore, the supporting shaft can be nipped more properly between the strength member and the stopping member.

DESCRIPTION OF EMBODIMENTS

Figure 3:
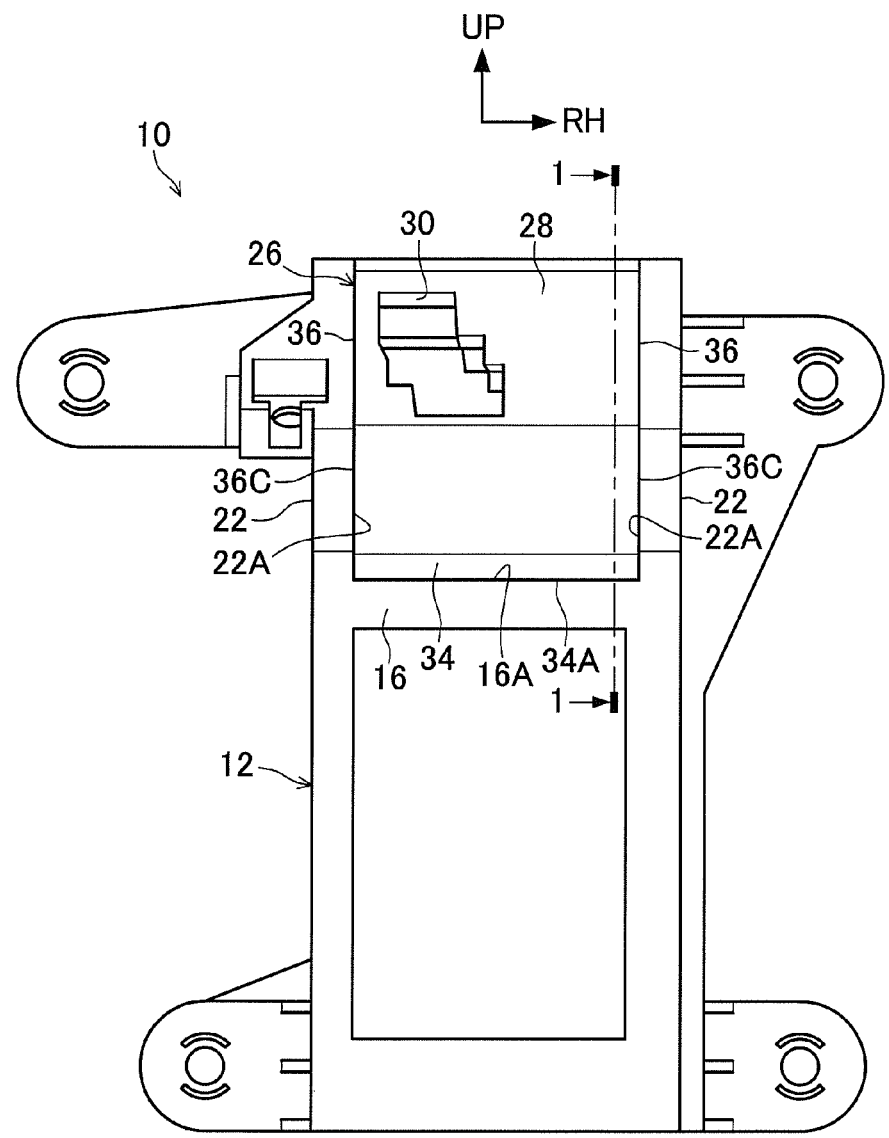
FIG. 3 is a rear view that is seen from the rear and illustrates the shift lever device relating to the embodiment of the present invention.
Figure 4:
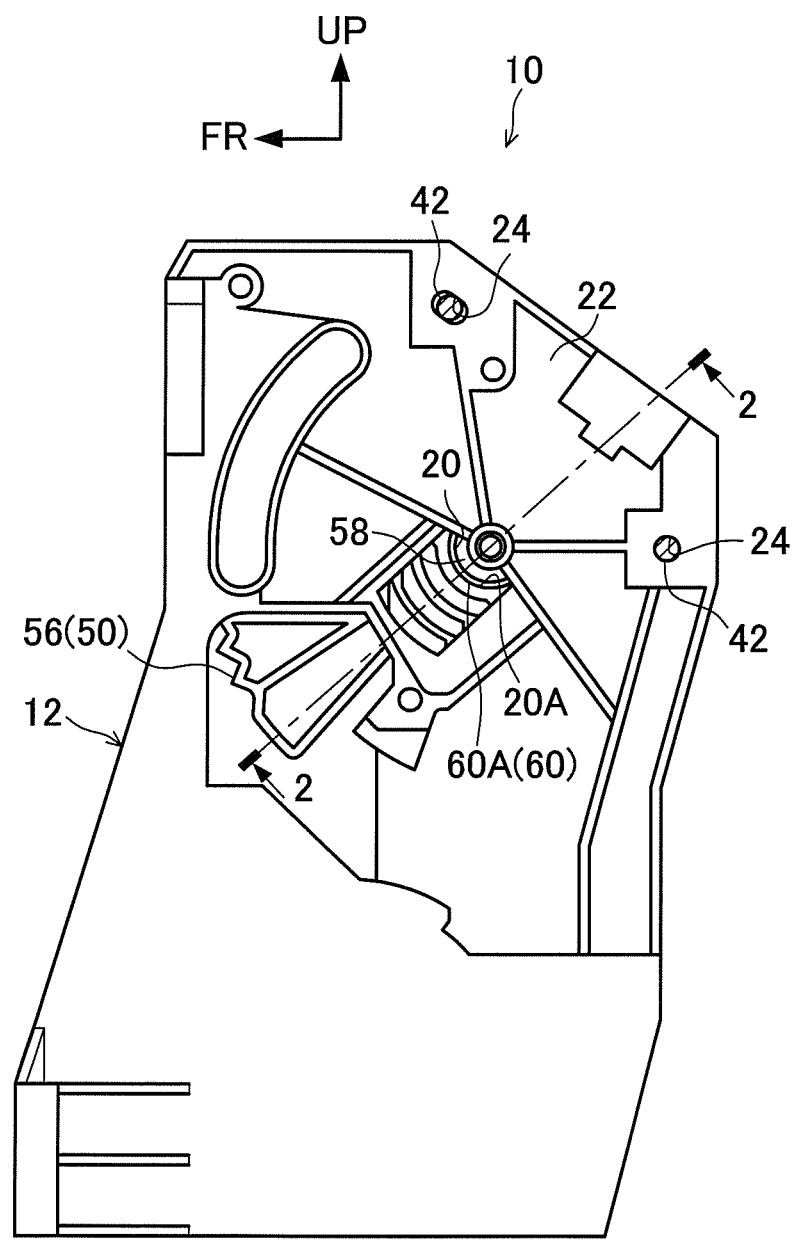
FIG. 4 is a side view that is seen from the left and illustrates the shift lever device relating to the embodiment of the present invention.
Figure 5:
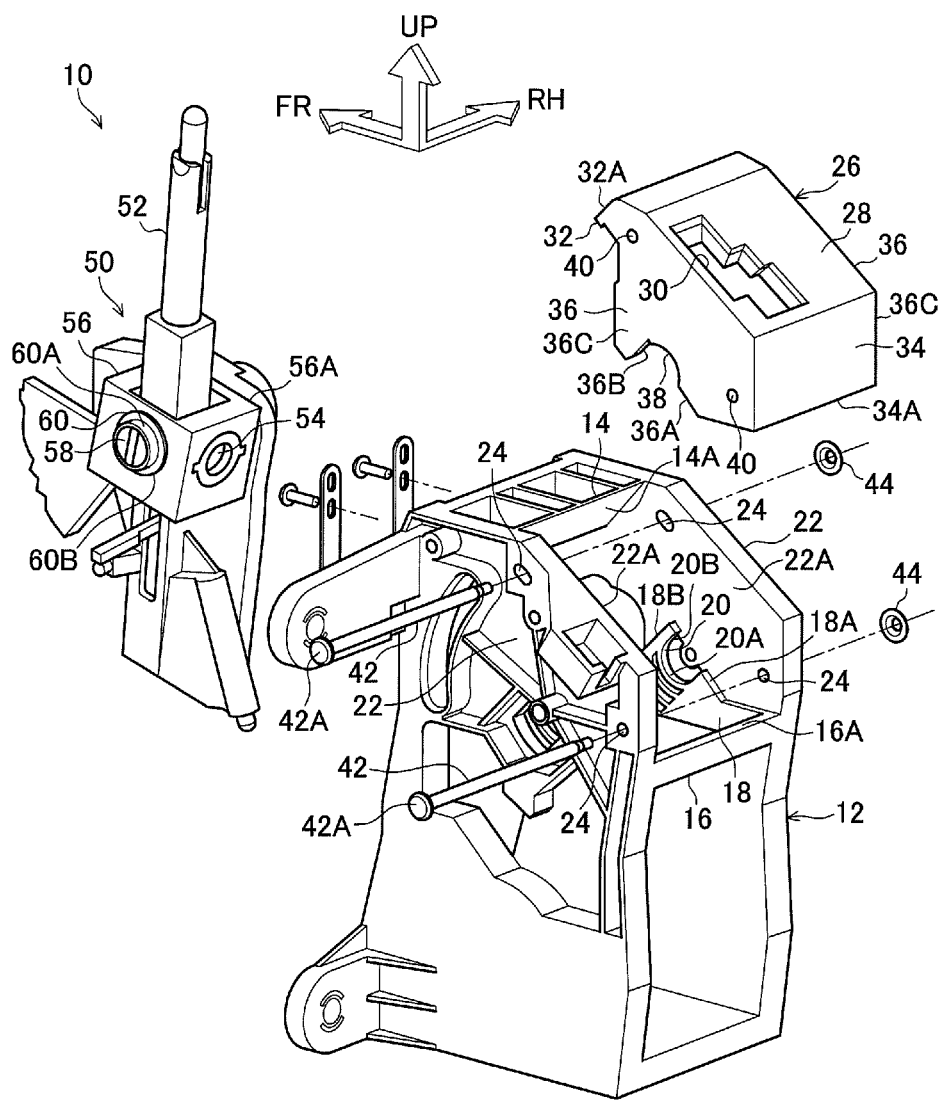
FIG. 5 is an exploded perspective view that is seen from an obliquely rear left side and illustrates the shift lever device relating to the embodiment of the present invention.

A shift lever device 10, that serves as a shift device relating to an embodiment of the present invention, is shown in FIG. 3 in a rear view seen from the rear. The shift lever device 10 is shown in FIG. 4 in a side view seen from the left. Moreover, the shift lever device 10 is shown in FIG. 5 in an exploded perspective view seen from an obliquely rear left side. Note that, in the drawings, the front of the shift lever device 10 is indicated by arrow FR, the right of the shift lever device 10 is indicated by arrow RH, and the upper side of the shift lever device 10 is indicated by arrow UP.

The shift lever device 10 relating to the present embodiment is applied to a vehicle (an automobile). The shift lever device 10 is a so-called floor-type device and is set on the floor portion (the floor) of the vehicle cabin. The front side, right side and upper side of the shift lever device 10 are directed toward the vehicle front side, the vehicle right side and the vehicle upper side, respectively.

As shown in FIG. 3 through FIG. 5, a shift lever plate 12 (housing), that is substantially shaped as a parallelepiped box and is made of resin and serves as a stopping member (housing member), is provided at the shift lever device 10. Due to the shift lever plate 12 being fixed to the vehicle cabin interior, the shift lever device 10 is set on the floor portion of the vehicle cabin. The interior of the shift lever plate 12 is open toward the front side except for at the upper end and the lower end, and the interior is open toward the rear side except for at the vertical direction intermediate portion and the lower end.

Figure 1:
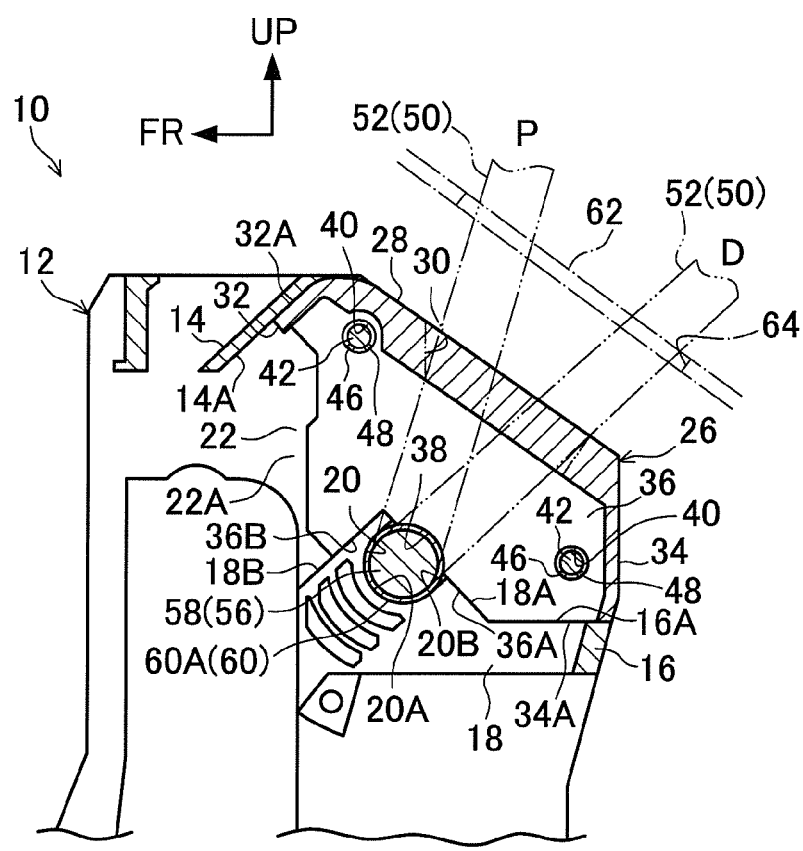
FIG. 1 is a cross-sectional view that is seen from the left and illustrates a shift lever device relating to an embodiment of the present invention (a cross-sectional view along line 1-1 of FIG. 3).

As shown in FIG. 1 as well, an upper plate 14, that is shaped as an elongated rectangular plate and serves as a first receiving portion, is provided at the upper end at the longitudinal direction intermediate portion of the shift lever plate 12. The upper plate 14 spans between the left wall and the right wall of the shift lever plate 12. The rear surface of the upper plate 14 is made to be an upper receiving surface 14A that is planar and serves as a first receiving surface. The upper receiving surface 14A is disposed parallel to the left-right direction, and is inclined in a direction heading downward while heading toward the front.

A lower plate 16, that is shaped as an elongated rectangular plate and serves as a second receiving portion, is provided at the rear end at the vertical direction intermediate portion of the shift lever plate 12. The lower plate 16 spans between the left wall and the right wall of the shift lever plate 12. The top surface of the lower plate 16 structures a lower receiving surface 16A that is planar and serves as a second receiving surface. The lower receiving surface 16A is disposed orthogonally to the vertical direction.

A receiving projection 18 serving as a third receiving portion is provided at each of the left wall and the right wall of the shift lever plate 12 at the front side of the lower plate 16. The receiving projections 18 project-out toward the left-right direction inner sides of the shift lever plate 12, and are integral with the lower plate 16. The top surfaces at the rear side portions of the receiving projections 18 are flush with the top surface of the lower plate 16, and, together with the top surface of the lower plate 16, structure the lower receiving surface 16A.

The top surfaces, that are further toward the front side than the lower receiving surface 16A, of the receiving projections 18 are made to be rear receiving surfaces 18A that are planar and serve as third receiving surfaces. The rear receiving surfaces 18A are disposed parallel to the left-right direction, and are inclined so as to head upward while heading toward the front, and are disposed perpendicular to the upper receiving surface 14A of the upper plate 14.

The top surfaces, that are further toward the front side than the rear receiving surfaces 18A, of the receiving projections 18 are made to be front receiving surfaces 18B that are planar and serve as fourth receiving surfaces. The front receiving surfaces 18B are disposed parallel to the left-right direction, and are inclined so as to head downward while heading toward the front, and are disposed parallel to the upper receiving surface 14A of the upper plate 14.

Lower supporting holes 20 that structure supporting holes are formed in the receiving projections 18. The lower supporting holes 20 open toward the left-right direction inner sides of the shift lever plate 12 and open toward an obliquely upper rear side from the rear receiving surfaces 18A of the receiving projections 18. The portions, at the lower sides and front sides, of the lower supporting holes 20 are made to be shaft supporting holes 20A that are semicylindrical, and the portions, at the upper sides and rear sides, of the lower supporting holes 20 are made to be insertion holes 20B that are rectangular column shaped. The diameter dimension of the circumferential surface of the shaft supporting hole 20A and the width dimension between the pair of side surfaces of the insertion hole 20B are made to be the same, and the circumferential surface of the shaft supporting hole 20A and the pair of side surfaces of the insertion hole 20B are connected smoothly. The pair of side surfaces of the insertion hole 20B are disposed parallel to the upper receiving surface 14A of the upper plate 14 and to the front receiving surface 18B of the receiving projection 18.

Lateral receiving portions 22 serving as fourth receiving portions are formed in the left wall and the right wall of the shift lever plate 12 between the upper plate 14 and the receiving projections 18. The surfaces, at the shift lever plate 12 left-right direction inner sides, of the lateral receiving portions 22 are made to be lateral receiving surfaces 22A that are planar and serve as fifth receiving surfaces. The lateral receiving surfaces 22A are disposed orthogonally to the left-right direction. Insert-through holes 24 that are substantially cylindrical are formed so as to pass-through the upper portions and the lower portions of the lateral receiving portions 22, respectively. The insert-through holes 24 are disposed parallel to the left-right direction.

A shift lever guide 26, that is substantially box-shaped and serves as a strength member (guiding member), is assembled to the portion at the upper side and rear side of the shift lever plate 12 interior. The shift lever guide 26 is formed of the same resin as the shift lever plate 12. The shift lever guide 26 is substantially box-shaped, and the shift lever guide 26 interior is open toward an obliquely lower front side.

An upper wall 28 that is substantially flat-plate-shaped is provided at the portion at the upper side and rear side of the shift lever guide 26. The upper wall 28 is inclined so as to head downward while heading toward the rear side. A guide hole 30 of a predetermined shape and serving as a restricting means is formed so as to pass-through the left side portion of the upper wall 28.

An upper side wall 32, that is substantially flat-plate-shaped and serves as a first abutment portion, is provided at the portion at the upper side and front side of the shift lever guide 26. The upper side wall 32 is disposed parallel to the left-right direction, and is inclined so as to head downward while heading toward the front. The front surface of the upper side wall 32 is made to be an upper abutment surface 32A that is planar and serves as a first abutment surface. The upper abutment surface 32A is disposed parallel to the upper receiving surface 14A of the shift lever plate 12, and planarly abuts (planarly contacts) the upper receiving surface 14A.

A lower side wall 34, that is substantially flat-plate-shaped and serves as a second abutment portion, is provided at the rear end of the shift lever guide 26. The lower side wall 34 is disposed substantially orthogonally to the longitudinal direction. The lower surface of the lower side wall 34 structures a lower abutment surface 34A that is planar and serves as a second abutment surface. The lower abutment surface 34A of the lower side wall 34 is disposed parallel to the lower receiving surface 16A of the lower plate 16 of the shift lever plate 12, and planarly abuts (planarly contacts) this lower receiving surface 16A.

Lateral side walls 36, that are substantially flat-plate-shaped and serve as third abutment portions, are provided at the left end and the right end of the shift lever guide 26. The lateral side walls 36 are disposed orthogonally to the left-right direction, and the surfaces thereof at the shift lever guide 26 left-right direction inner sides are flush with the surfaces, at the shift lever plate 12 left-right direction inner sides, of the receiving projections 18 of the shaft lever plate 12. The left-right direction distance between the pair of lateral side walls 36 is made to be short as compared with the shortest distance, along the upper wall 28, between the upper side wall 32 and the lower side wall 34.

The bottom surfaces of the rear side portions of the lateral side walls 36 are flush with the bottom surface of the lower side wall 34 and, together with the bottom surface of the lower side wall 34, structure the lower abutment surface 34A. The lower abutment surface 34A of the lateral side walls 36 is disposed parallel to the lower receiving surface 16A of the lower plate 16 and the receiving projections 18 of the shift lever plate 12, and planarly abuts (planarly contacts) this lower receiving surface 16A.

The bottom surfaces, that are further toward the front side than the lower abutment surface 34A, of the lateral side walls 36 are made to be rear abutment surfaces 36A that are planar and serve as third abutment surfaces. The rear abutment surfaces 36A are disposed parallel to the rear receiving surfaces 18A of the shift lever plate 12, and planarly abut (planarly contact) the rear receiving surfaces 18A.

The bottom surfaces, that are further toward the front side than the rear abutment surfaces 36A, of the lateral side walls 36 are made to be front abutment surfaces 36B that are planar and serve as fourth abutment surfaces. The front abutment surfaces 36B are disposed parallel to the front receiving surfaces 18B of the shift lever plate 12, and planarly abut (planarly contact) the front receiving surfaces 18B.

Upper supporting holes 38A that structure the supporting holes are formed so as to pass-through the lateral side walls 36. The upper supporting holes 38A open toward an obliquely lower front side from the rear abutment surfaces 36A of the lateral side walls 36. The upper supporting holes 38A communicate with the lower supporting holes 20 of the shift lever plate 12, and the peripheral surfaces of the upper supporting holes 38A are made to be the same circumferential surfaces as the circumferential surfaces of the shaft supporting holes 20A of the lower supporting holes 20. Further, the strength of the peripheral portions of the upper supporting holes 38A of the shift lever guide 26 is low as compared with that of the peripheral portions of the lower supporting holes 20 of the shift lever plate 12.

The surfaces, at the shift lever guide 26 left-right direction outer sides, of the lateral side walls 36 are made to be lateral abutment surfaces 36C that are planar and serve as fifth abutment surfaces. The lateral abutment surfaces 36C are disposed parallel to the lateral receiving surfaces 22A of the shift lever plate 12, and planarly abut (planarly contact) the lateral receiving surfaces 22A.

Assembly holes 40 that are substantially cylindrical are formed so as to pass-through the upper portions and the lower portions of the lateral side walls 36 respectively. The assembly holes 40 are disposed parallel to the left-right direction.

Pins 42, that are elongated and substantially cylindrical and that respectively serve as assembly members, are press-fit into and made to pass-through the insert-through holes 24 at the upper portions of the lateral receiving portions 22 of the shift lever plate 12 and the assembly holes 40 at the upper portions of the lateral side walls 36, and the insert-through holes 24 at the lower portions of the lateral receiving portions 22 and the assembly holes 40 at the lower portions of the lateral side walls 36. The pins 42 are fixed within the insert-through holes 24 and within the assembly holes 40. At one ends (left ends) of the pins 42, disc-shaped head portions 42A are formed such that the diameters are enlarged, and, at the other ends (right ends) of the pins 42, bush nuts 44 that are substantially annular plate shaped are fixed. The shift lever guide 26 is assembled to the shift lever plate 12 due to the shift lever plate 12 and the shift lever guide 26 being nipped between the head portions 42A and the bush nuts 44.

As shown in FIG. 1, a first rib 46 (crush rib), that is columnar and serves as a pressing portion, is formed to project integrally with the peripheral surface of the assembly hole 40 at the portion at the front side and lower side. The first rib 46 is disposed parallel to the axial direction of the assembly hole 40 (the left-right direction). The first rib 46 is crushingly (compressively) deformed by the pin 42. Due to the elastic forces (shape restoring forces) of the first ribs 46, the shift lever guide 26 is urged (pressed) in a lower side direction that is orthogonal to the rear receiving surfaces 18A of the shift lever plate 12 and the rear abutment surfaces 36A of the shift lever guide 26.

A second rib 48 (crush rib), that is columnar and serves as a pressing portion, is formed to project integrally with the peripheral surface of the assembly hole 40 at the portion at the rear side and lower side. The second rib 48 is disposed parallel to the axial direction of the assembly hole 40 (the left-right direction). The second rib 48 is crushingly (compressively) deformed by the pin 42. Due to the elastic forces (shape restoring forces) of the second ribs 48, the shift lever guide 26 is urged (pressed) in a lower side direction that is orthogonal to the front receiving surfaces 18B of the shift lever plate 12 and the front abutment surfaces 36B of the shift lever guide 26.

As shown in FIG. 5, a lever sub-assembly 50 (shift unit) is assembled at the interior of the shift lever plate 12 and the shift lever guide 26.

A shift lever 52, that is shaped as an elongated rod and serves as a shift member, is provided at the lever sub-assembly 50. The shift lever 52 passes-through the guide hole 30 of the shift lever guide 26, and extends-out toward the upper side of the shift lever guide 26. A knob (not illustrated) serving as a grasping portion is fixed to the upper end of the shift lever 52, and a passenger (the driver) of the vehicle can grasp the knob.

A rotating shaft 54 that is shaped as a circular shaft is provided integrally with the axial direction intermediate portion of the shift lever 52. The rotating shaft 54 is divided at the front side and the rear side of the shift lever 52, and projects-out at the front side and the rear side of the shift lever 52.

The shift lever 52 is supported by a supporting body 56 that serves as a supporting member. A supporting tube 56A that is substantially shaped as a rectangular tube is provided at the left side portion of the supporting body 56. The shift lever 52 is inserted-through the interior of the supporting tube 56A.

The rotating shaft 54 of the shift lever 52 is supported so as to rotate freely, at the front wall and the rear wall of the supporting tube 56A. The shift lever 52 is supported by the supporting body 56 (the supporting tube 56A) so as to be able to be tilted (rotated) in the left-right direction (selecting direction) around the rotating shaft 54, and can be tilted (rotated) in the longitudinal and vertical directions (shifting directions) integrally with the supporting body 56 (the supporting tube 56A).

Figure 2:
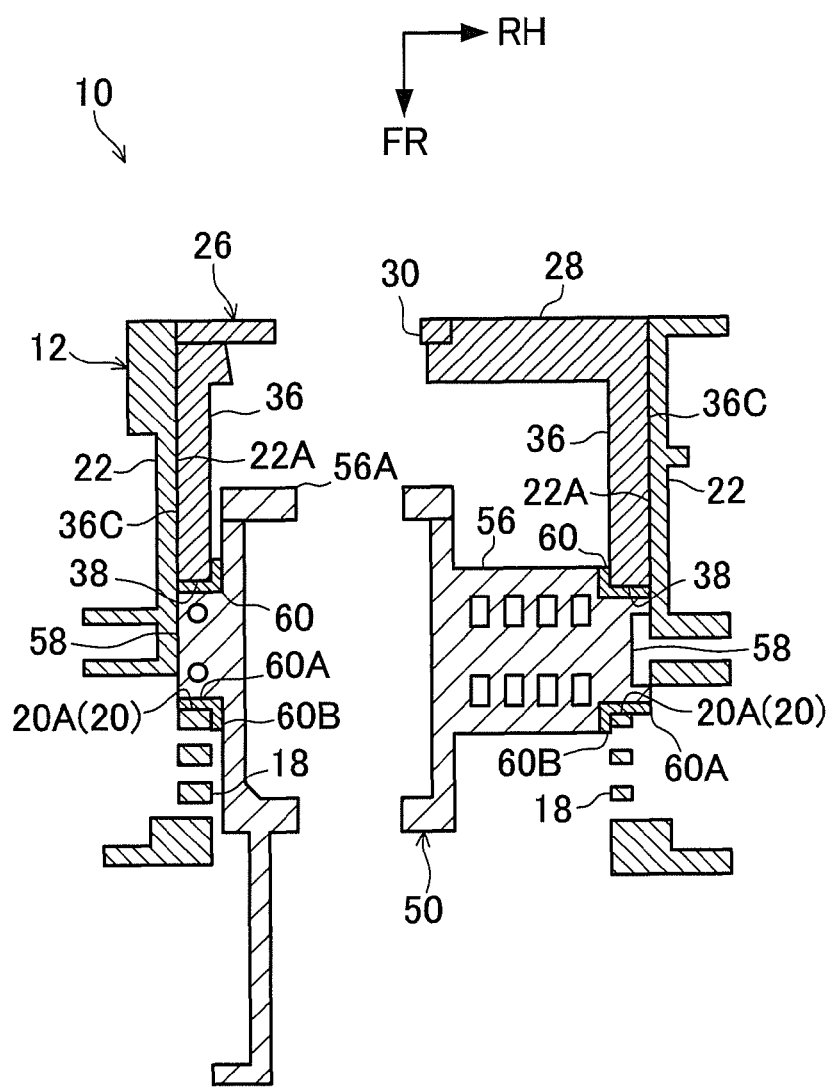
FIG. 2 is a cross-sectional view that is seen from a lower side and illustrates the shift lever device relating to the embodiment of the present invention (a cross-sectional view along line 2-2 of FIG. 4).

As shown in detail in FIG. 2, a tilt shaft 58, that is shaped as a circular shaft and serves as a supporting shaft, is provided integrally with the supporting body 56. The tilt shaft 58 is divided at the right side and the left side of the supporting body 56, and projects-out to the right side and the left side of the supporting body 56.

Bushes 60 that respectively serve as shaft supporting members, are mounted to the tilt shaft 58 at the left side and the tilt shaft 58 at the right side. The bushes 60 are manufactured of a resin that is flexible (e.g., Hytrel® that is a thermoplastic polyester elastomer). A bush tube 60A, that is cylindrical tube shaped and serves as a shaft supporting portion, is provided at the bush 60. The tilt shaft 58 is fit-into (weakly press-fit into) the bush tube 60A so as to be able to rotate. A flange 60B that is annular plate shaped is provided coaxially at the end portion at the supporting body 56 side of the bush 60. The flange 60B projects-out toward the outer side over the entire periphery of the bush tube 60A.

The tilt shaft 58 and the bush tubes 60A of the bushes 60 are inserted into the lower supporting holes 20 of the shift lever plate 12 and the upper supporting holes 38A of the shift lever guide 26. The flanges 60B of the bushes 60 are nipped (weakly press-fit) between the receiving projections 18 of the shift lever plate 12 and the lateral side walls 36 of the shift lever guide 26 and the supporting body 56. The tilt shaft 58 and the bush tubes 60A are nipped (weakly press-fit) between the circumferential surfaces of the shaft supporting holes 20A of the lower supporting holes 20 and the circumferential surfaces of the upper supporting holes 38A, and are rotatably supported. The shift lever 52 is supported so as to be able to tilt (rotate) in the longitudinal and vertical directions (shifting directions) around the tilt shaft 58 integrally with the supporting body 56 (the supporting tube 56A).

Due to the shift lever 52 being tiltably operated in the longitudinal and vertical directions and in the left-right direction while being guided by the guide hole 30 of the shift lever guide 26 in the state in which the knob at the upper end is grasped by a passenger, the shift position of the shift lever 52 (e.g., a "P" shift position (parking position), an "R" shift position (reverse position), an "N" shift position (neutral position) and a "D" shift position (drive position) in that order from the front side and the upper side toward the rear side and the lower side) can be changed.

The tilting of the shift lever 52 can be restricted (stopped) by the peripheral surface of the guide hole 30. When the shift lever 52 is positioned at the "P" shift position, tilting of the shift lever 52 toward an obliquely upper front side is restricted by the peripheral surface of the front edge of the guide hole 30. Moreover, when the shift lever 52 is positioned at the "D" shift position, tilting of the shift lever 52 toward an obliquely lower rear side is restricted by the peripheral surface of the rear edge of the guide hole 30. Further, tilting of the shift lever 52 toward the left is restricted by the peripheral surface at the left side of the guide hole 30, and tilting of the shift lever 52 toward the right is restricted by the peripheral surface at the right side of the guide hole 30.

Figure 6:
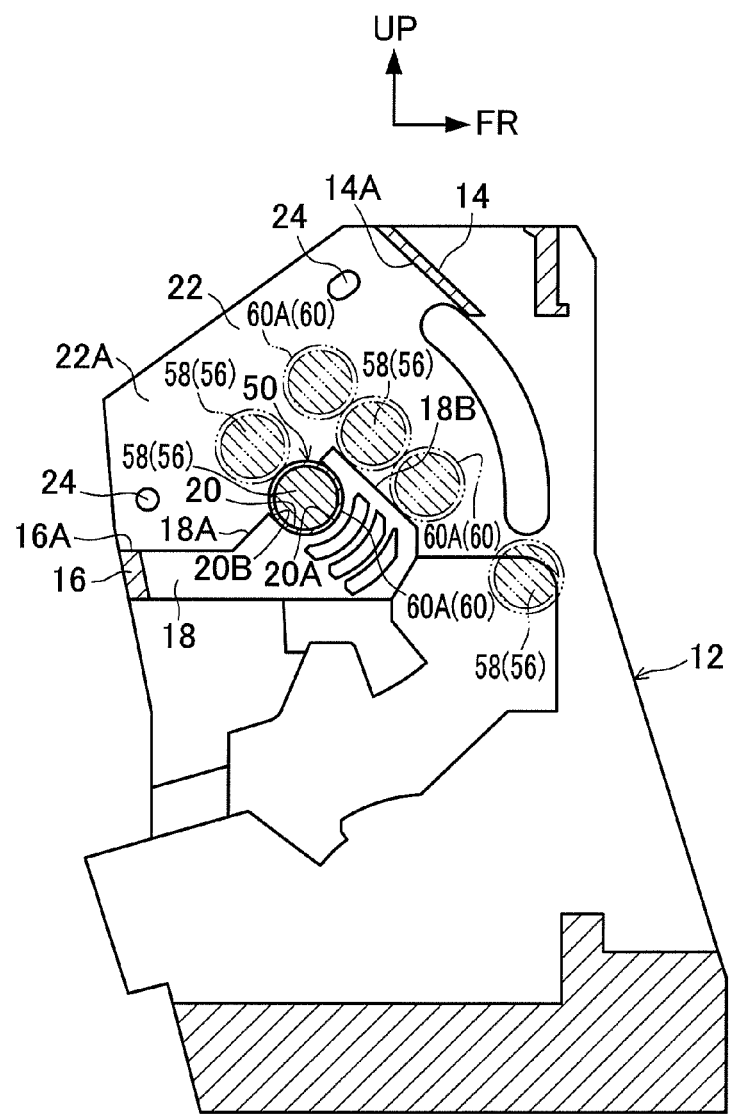
FIG. 6 is a cross-sectional view that is seen from the right and illustrates a state in which a lever sub-assembly is assembled to a shift lever plate in the shift lever device relating to the embodiment of the present invention.

At the time of assembling the lever sub-assembly 50 to the shift lever plate 12, before the shift lever guide 26 is assembled to the shift lever plate 12, the lever sub-assembly 50 is inserted into the shift lever plate 12 from the front side. In this case, in a state in which the shift lever 52 of the lever sub-assembly 50 is passed-through between the upper plate 14 and the receiving projections 18 of the shift lever plate 12 and is extended toward an obliquely upper rear side of the shift plate 12, as shown in FIG. 6, the tilt shaft 58 of the supporting body 56 and the bush tubes 60A of the bushes 60 at the lever sub-assembly 50 are passed from the upper side of the front receiving surfaces 18B of the receiving projections 18 at the shift lever plate 12 to the upper sides of the rear receiving surfaces 18A of the receiving projections 18, and are inserted into the lower supporting holes 20 of the receiving projections 18.

As shown in FIG. 1, a cover 62, that is plate-shaped and is made of resin and serves as a through member, is provided at the vehicle cabin side of the shift lever plate 12 and the shift lever guide 26. The strength of the cover 62 is low as compared with that of the shift lever guide 26. The cover 62 covers the vehicle cabin sides of the shift lever plate 12 and the shift lever guide 26, and the cover 62 structures the design surface, at the vehicle cabin side, of the shift lever device 10.

A passage hole 64 is formed so as to pass-through the cover 62, and the shift lever 52 is passed-through the passage hole 64. The passage hole 64 is formed in a shape that is similar to, but enlarged in comparison with, the guide hole 30 of the shift lever guide 26. The shift lever 52 is, in a state of not abutting the peripheral surface of the passage hole 64, passed-through the passage hole 64 and is made able to be tilted in the longitudinal and vertical directions and in the left-right direction. Note that the shift position at which the shift lever 52 is disposed is shown on the vehicle cabin side surface of the cover 62 at the side of the passage hole 64.

Operation of the present embodiment is described next.

In the shift lever device 10 of the above-described structure, the shift lever 52 is made able to tilt in the left-right direction around the rotating shaft 54, and is made able to tilt in the longitudinal and vertical directions around the tilt shaft 58 of the supporting body 56. Due thereto, the shift position of the shift lever 52 is changed due to the knob at the upper end of the shift lever 52 being grasped, and the shift lever 52 being guided by the guide hole 30 of the shift lever guide 26, and the shift lever 52 being tiltingly operated while being made to pass within the passage hole 64 of the cover 62.

Further, the shift lever 52 is supported so as to be able to tilt in the longitudinal and vertical directions around the tilt shaft 58 integrally with the supporting body 56, due to the tilt shaft 58 of the supporting body 56 being, via the bush tubes 60A of the bushes 60, nipped between the circumferential surfaces of the lower supporting holes 20 (shaft supporting holes 20A) of the shift lever plate 12 and the circumferential surfaces of the upper supporting holes 38A of the shift lever guide 26.

Moreover, at the time when tilting, toward an obliquely upper front side, of the shift lever 52 that is disposed at the "P" shift position is restricted by the peripheral surface at the front edge of the guide hole 30, rotational load toward the front side is inputted to the shift lever guide 26 due to the tilting force of the shift lever 52 toward an obliquely upper front side. Moreover, at the time when tilting, toward an obliquely lower rear side, of the shift lever 52 that is disposed at the "D" shift position is restricted by the peripheral surface at the rear edge of the guide hole 30, rotational load toward the rear side is inputted to the shift lever guide 26 due to the tilting force of the shift lever 52 toward an obliquely lower rear side. Further, at the time when tilting of the shift lever 52 toward the left is restricted by the peripheral surface at the left side of the guide hole 30, rotational load toward the left side is inputted to the shift lever guide 26 due to the tilting force of the shift lever 52 toward the left. At the time when tilting of the shift lever 52 toward the right is restricted by the peripheral surface at the right side of the guide hole 30, rotational load toward the right side is inputted to the shift lever guide 26 due to the tilting force of the shift lever 52 toward the right.

Here, the strength of the shift lever guide 26 is made to be high as compared with that of the cover 62. Therefore, the nipping rigidity of the tilt shaft 58 by the circumferential surfaces of the upper supporting holes 38A of the shift lever guide 26 is made to be high.

Further, at the time when tilting, toward an obliquely upper front side, of the shift lever 52 that is disposed at the "P" shift position is restricted by the peripheral surface at the front edge of the guide hole 30 and rotational load (a particularly high load) toward the front side is inputted to the shift lever guide 26, the upper abutment surface 32A of the shift lever guide 26 is made to planarly abut the upper receiving surface 14A of the shift lever plate 12, and the front abutment surfaces 36B of the shift lever guide 26 are made to planarly abut the front receiving surfaces 18B of the shift lever plate 12. Due thereto, rotation of the shift lever guide 26 toward the front side is stopped, and deformation of the upper supporting hole 38A portions of the shift lever guide 26 is suppressed.

Moreover, at the time when tilting, toward an obliquely lower rear side, of the shift lever 52 that is disposed at the "D" shift position is restricted by the peripheral surface at the rear edge of the guide hole 30 and rotational load (a particularly high load) toward the rear side is inputted to the shift lever guide 26, the upper abutment surface 32A of the shift lever guide 26 is made to planarly abut the upper receiving surface 14A of the shift lever plate 12, and the lower abutment surface 34A of the shift lever guide 26 is made to planarly abut the lower receiving surface 16A of the shift lever plate 12. Due thereto, rotation of the shift lever guide 26 toward the rear side is stopped, and deformation of the upper supporting hole 38A portions of the shift lever guide 26 is suppressed.

Moreover, at the time when tilting of the shift lever 52 toward the left is restricted by the peripheral surface at the left side of the guide hole 30 and rotational load (a particularly high load) toward the left side is inputted to the shift lever guide 26, and at the time when tilting of the shift lever 52 toward the right is restricted by the peripheral surface at the right side of the guide hole 30 and rotational load (a particularly high load) toward the right side is inputted to the shift lever guide 26, the lateral abutment surfaces 36C of the shift lever guide 26 are made to planarly abut the lateral receiving surfaces 22A of the shift lever plate 12. Due thereto, rotation of the shift lever guide 26 toward the left side and the right side is stopped, and deformation of the upper supporting hole 38A portions of the shift lever guide 26 is suppressed.

Due thereto, the tilt shaft 58 can be nipped properly between the peripheral surfaces of the lower supporting holes 20 of the shift lever plate 12 and the peripheral surfaces of the upper supporting holes 38A of the shift lever guide 26, and the shift lever 52 can be supported so as to be able to tilt around the tilt shaft 58 properly. Moreover, therefore, also at the time when high load is inputted from the shift lever 52 to the shift lever guide 26, nipping of the tilt shaft 58 into between the peripheral surface of the upper supporting hole 38A and the peripheral surface of the upper supporting hole 38A being cancelled and the lever sub-assembly 50 falling-out from the shift lever plate 12 and the shift lever guide 26 can be suppressed or prevented.

Moreover, the strength of the peripheral portions of the lower supporting holes 20 of the shift lever plate 12 is made to be high as compared with that of the peripheral portions of the upper supporting holes 38A of the shift lever guide 26, and the receiving projections 18 of the shift lever plate 12 support the tilt shaft 58 at the both sides in the tilting directions (the longitudinal and vertical directions) of the shift lever 52 around the tilt shaft 58. In particular, the lower supporting holes 20 are disposed so as to have plane symmetry, and the receiving projections 18 support the tilt shaft 58 with high rigidity, in the tilting directions, around the tilt shaft 58, of the shift lever 52 that is disposed at the "D" shift position that is the shift position at which it is supposed that a maximum load will be inputted to the shift lever 52. Therefore, movement of the tilt shaft 58 toward the both sides in the tilting directions of the shift lever 52 around the tilt shaft 58 can be effectively restricted, and the tilt shaft 58 can be nipped more properly between the peripheral surfaces of the lower supporting holes 20 and the peripheral surfaces of the upper supporting holes 38A, and shift lever 52 can be supported so as to be able to tilt around the tilt shaft 58 more properly.

Moreover, at the lower supporting holes 20 of the shift lever plate 12, not only are the shaft supporting holes 20A that are semicylindrical provided, but also, the insertion holes 20B that are rectangular column shaped are provided and are made to be large. The central angle (approximately 270° in the present embodiment) of the tilt shaft 58, that can be supported by the peripheral surfaces of the lower supporting holes 20 whose strength is greater, is made to be large as compared with the central angle (approximately 90° in the present embodiment) of the tilt shaft 58 that can be supported by the peripheral surfaces of the upper supporting holes 38A whose strength is lower. Therefore, movement of the tilt shaft 58 toward the both sides in the tilting directions of the shift lever 52 around the tilt shaft 58 can be restricted more effectively, and the tilt shaft 58 can be nipped more properly between the peripheral surfaces of the lower supporting holes 20 and the peripheral surfaces of the upper supporting holes 38A, and the shift lever 52 can be supported so as to be able to tilt around the tilt shaft 58 more properly.

Moreover, at the shift lever guide 26, the distance in the left-right direction between the pair of lateral side walls 36 is made to be short as compared with the shortest distance, along the upper wall 28, between the upper side wall 32 and the lower side wall 34. The pins 42 are passed-through (press-fit into) the lateral receiving portions 22 (the insert-through holes 24) of the shift lever plate 12 and the lateral side walls 36 (the assembly holes 40) of the shift lever guide 26, and the shift lever guide 26 is assembled to the shift lever plate 12. Therefore, as compared with a case in which the pins 42 are passed-through the upper wall and the rear wall of the shift lever plate 12 and the upper side wall 32 and the lower side wall 34 of the shift lever guide 26, and the shift lever guide 26 is assembled to the shift lever plate 12, the length of the pins 42 can be made to be short, and the shift lever guide 26 can be assembled securely to the shift lever plate 12. Moreover, as compared with a case in which the shift lever guide 26 is assembled to the shift lever plate 12 by screws, rattling of the shift lever guide 26 with respect to the shift lever plate 12 can be suppressed. Therefore, the tilt shaft 58 can be nipped more properly between the peripheral surfaces of the lower supporting holes 20 and the peripheral surfaces of the upper supporting holes 38A, and the shift lever 52 can be supported so as to be able to tilt around the tilt shaft 58 more properly.

Further, the bush tubes 60A of the bushes 60 are nipped (weakly press-fit) between the circumferential surfaces of the lower supporting holes 20 and the circumferential surfaces of the upper supporting holes 38A and the tilt shaft 58. Therefore, rattling of the tilt shaft 58 can be suppressed, and the tilt shaft 58 can be nipped more properly between the peripheral surfaces of the lower supporting holes 20 and the peripheral surfaces of the upper supporting holes 38A, and the shift lever 52 can be supported so as to be able to tilt around the tilt shaft 58 more properly.

Moreover, due to the first ribs 46 of the peripheral surfaces of the assembly holes 40 of the shift lever guide 26 being crushingly deformed by the pins 42, by the elastic forces of the first ribs 46, the pressure, at which the rear abutment surfaces 36A of the shift lever guide 26 are made to planarly abut the rear receiving surfaces 18A of the shift lever plate 12, is increased, and the force of nipping the tilt shaft 58 between the circumferential surfaces of the lower supporting holes 20 and the circumferential surfaces of the upper supporting holes 38A is increased. Moreover, due to the second ribs 48 of the peripheral surfaces of the assembly holes 40 of the shift lever guide 26 being crushingly deformed by the pins 42, the pressure, at which the front abutment surfaces 36B of the shift lever guide 26 are made to planarly contact the front receiving surfaces 18B of the shift lever plate 12, is increased by the elastic forces of the second ribs 48. Therefore, rattling of the tilt shaft 58 can be suppressed more, and the tilt shaft 58 can be nipped more properly between the circumferential surfaces of the lower supporting holes 20 and the circumferential surfaces of the upper supporting holes 38A, and the shift lever 52 can be supported so as to be able to tilt around the tilt shaft 58 more properly.

Further, the tilt shaft 58 is supported by the shift lever plate 12, that houses the shift lever 52, and by the shift lever guide 26, that guides the tilting of the shift lever 52 by the guide hole 30, and the shift lever 52 is supported so as to be able to tilt around the tilt shaft 58. Therefore, parts for supporting the tilt shaft 58 do not have to be provided separately, and the number of parts can be reduced.

Note that, in the present embodiment, the strength of the peripheral portions of the lower supporting holes 20 of the shift lever plate 12 is made to be high as compared with that of the peripheral portions of the upper supporting holes 38A of the shift lever guide 26. However, the strength of the peripheral portions of the upper supporting holes 38A of the shift lever guide 26 may be made to be low as compared with that of the peripheral portions of the lower supporting holes 20 of the shift lever plate 12. In this case, the shape of the lower supporting holes 20 may be made to be the shape of the upper supporting holes 38A of the present embodiment, and the shape of the upper supporting holes 38A may be made to be the shape of the lower supporting holes 20 of the present embodiment.

Moreover, in the present embodiment, the first ribs 46 and the second ribs 48 are provided at the shift lever guide 26 (at the peripheral surfaces of the assembly holes 40). However, at least one of the first ribs 46 and the second ribs 48 may be provided at the shift lever plate 12 (e.g., at the peripheral surfaces of the insert-through holes 24).

Further, although the shift lever device 10 is a floor-type device and is set on the floor portion of the vehicle cabin in the present embodiment, the shift lever device 10 may be set at the steering column or the instrument panel of the vehicle.

The invention claimed is:

1. A shift device comprising:
   a shift member at which a supporting shaft is provided, and whose shift position is changed due to the shift member being tilted;
   a through member through which the shift member is tiltably passed;
   a strength member through which the shift member is tiltably passed at further toward a supporting shaft side than the through member, and whose strength is high as compared with that of the through member; and
   a stopping member at which the shift member is tiltably supported due to the supporting shaft being nipped between the stopping member and the strength member, and that stops displacement of the strength member that is due to load inputted from the shift member, the stopping member abutting an upper side of the supporting shaft, and the strength member abutting a lower side of the supporting shaft.

2. The shift device of claim 1,
   wherein a stronger of the strength member and the stopping member supports the supporting shaft at tilting direction both sides of the shift member.

3. The shift device of claim 1,
   wherein a central angle of the supporting shaft, that is supported by a stronger of the strength member and the stopping member, is made to be large as compared with a central angle of the supporting shaft that is supported by a weaker of the strength member and the stopping member.

4. The shift device of claim 1, further comprising
   a pressing portion that is provided at the strength member or the stopping member, and that, by being deformed at a time when the strength member and the stopping member are assembled, presses the strength member or the stopping member, and increases at least one of a stopping force of the strength member by the stopping member and a nipping force applied to the supporting shaft by the strength member and the stopping member.

5. The shift device of claim 1, further comprising
   an assembly member that is passed-through the strength member and the stopping member at a side where a pass-through length is short, and that connects the strength member and the stopping member.

6. The shift device of claim 1, further comprising
   an assembly member that assembles the strength member and the stopping member without being screwed-into the strength member and the stopping member.

7. The shift device of claim 1, further comprising
   a shaft supporting member that is flexible and that is nipped between the supporting shaft, and the strength member and the stopping member.

8. The shift device of claim 1, wherein the stopping member houses the shift member.

9. The shift device of claim 1, wherein the strength member guides tilting of the shift member.

10. The shift device of claim 1, wherein the through member structures a design surface at a vehicle cabin side.

\* \* \* \* \*